United States Patent
Nylander et al.

(10) Patent No.: US 9,113,331 B2
(45) Date of Patent: Aug. 18, 2015

(54) VALIDATING USER IDENTITY BY COOPERATION BETWEEN CORE NETWORK AND ACCESS CONTROLLER

(75) Inventors: Tomas Nylander, Värmdö (SE); Jari Tapio Vikberg, Järna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1846 days.

(21) Appl. No.: 12/097,829

(22) PCT Filed: Dec. 23, 2005

(86) PCT No.: PCT/IB2005/003862
§ 371 (c)(1),
(2), (4) Date: Aug. 21, 2008

(87) PCT Pub. No.: WO2007/072104
PCT Pub. Date: Jun. 28, 2007

(65) Prior Publication Data
US 2008/0305768 A1  Dec. 11, 2008

(51) Int. Cl.
*H04W 12/06* (2009.01)
(52) U.S. Cl.
CPC ................................ *H04W 12/06* (2013.01)
(58) Field of Classification Search
USPC .......................................... 370/331; 709/225
See application file for complete search history.

(56) References Cited

U.S. PATENT DOCUMENTS

| 6,081,705 A * | 6/2000 | Houde et al. ................... 455/411 |
| 2002/0111180 A1* | 8/2002 | Hogan et al. ................... 455/518 |
| 2002/0151304 A1* | 10/2002 | Hogan ........................... 455/436 |
| 2003/0003895 A1* | 1/2003 | Wallentin et al. ............. 455/410 |
| 2003/0013443 A1* | 1/2003 | Willars et al. ................. 455/432 |
| 2003/0040314 A1* | 2/2003 | Hogan et al. .................. 455/435 |

(Continued)

FOREIGN PATENT DOCUMENTS

| WO | WO 2005076648 A1 * | 8/2005 | ............... H04Q 7/38 |
| WO | WO 2005086430 A1 * | 9/2005 | ............... H04L 12/56 |

OTHER PUBLICATIONS

"Digital Cellular Telecommunications System (Phase 2+); General Packet Radio Service (GPRS); Base Station System (BSS)—Serving GPRS Support Node (SGSN); BSS GPRS Protocol (BSSGP) (3GPP TS 48 018 version 6 10.0 Release 6); ETSI TS 148 018" ETSI Standards European Telecommunications Standards Institute, Sophia-Antipo, FR, vol. 3-G2, No. V6100. Sep. 2005, XP014032096 ISSN 0000-0001 Cited in application p. 38, line 22—p. 40, line.

(Continued)

*Primary Examiner* — Brandon Renner
*Assistant Examiner* — Scott M Sciacca

(57) ABSTRACT

An identifier, required by a radio access network controller in order to support resource allocation associated with a predetermined condition, is sent from a core network to the radio access network controller independently of the predetermined condition. The identifier is thus available to the radio access network controller for verification of mobile user identity, regardless of whether it is needed to support resource allocation. A radio access network controller can receive an identifier in a communication sent by a core network according to a communication protocol. The radio access network controller terminates the communication protocol to access the communication, and uses the identifier for verification of mobile user identity.

14 Claims, 2 Drawing Sheets

(56) References Cited

U.S. PATENT DOCUMENTS

| | | |
|---|---|---|
| 2003/0065952 A1 | 4/2003 | Otsuka |
| 2004/0192211 A1* | 9/2004 | Gallagher et al. ......... 455/67.11 |
| 2005/0070283 A1* | 3/2005 | Hashimoto et al. ........ 455/435.1 |
| 2005/0227687 A1* | 10/2005 | Drevon ...................... 455/432.1 |
| 2005/0266853 A1* | 12/2005 | Gallagher et al. ............ 455/439 |
| 2006/0270411 A1* | 11/2006 | Grayson ....................... 455/444 |
| 2007/0008885 A1* | 1/2007 | Bonner ......................... 370/230 |
| 2008/0130637 A1* | 6/2008 | Kant et al. .................... 370/389 |
| 2009/0275332 A1* | 11/2009 | Niska et al. ................... 455/436 |

OTHER PUBLICATIONS

SP-030567 3GPP TSG-SA WG2 Meeting #35: Bangkok, Oct. 27-31, 2003. Retrieved from the Internet at: http:www.3gpp.org/ftp/tsg_sa/TSG-SA/TSGS_22/Docs/PDF?SP-030567.pdf.

* cited by examiner

VALIDATING USER IDENTITY BY COOPERATION BETWEEN CORE NETWORK AND ACCESS CONTROLLER

FIELD OF THE INVENTION

The invention relates generally to wireless mobile communication systems and, more particularly, to the identification of mobile users of such systems.

BACKGROUND OF THE INVENTION

Conventional wireless mobile communication systems typically include a wireless access point or base station that communicates with mobile user (subscriber) terminals or stations via a wireless communication link. The access point or base station is coupled to a radio access network controller, and together they form a radio access network. The radio access network is coupled to a core network that includes both a circuit-switched (CS) facility and a packet-switched (PS) facility. Interfaces provided between the radio access network controller and the core network respectively support circuit-switched traffic associated with the circuit-switched facility and packet-switched traffic associated with the packet-switched facility. In GSM systems, for example, the radio access network is referred to as GSM Edge Radio Access Network (GERAN), the radio access network controller is referred to as a Base Station Controller (BSC), the interface for circuit-switched traffic is referred to as the A-interface, the interface for packet-switched traffic is referred to as the Gb-interface, the circuit-switched facility is referred to as a Mobile Switching Center (MSC), and the packet-switched facility is referred to as a Serving General Packet Radio Services (GPRS) Support Node (SGSN).

Conventional radio access networks other then GERAN are capable of cooperation with the aforementioned MSC and SGSN via the aforementioned A- and Gb-interfaces. In some of these radio access networks, the access point uses unlicensed radio technologies such as WiFi or Bluetooth to communicate with mobile stations, and communicates with the radio access network controller via an IP (Internet Protocol) link over, for example, an xDSL connection. One example is the so-called UMA (Unlicensed Mobile Access) radio access network, wherein the radio access network controller is referred to as the UMA Network Controller (UNC). UMA has been adopted as a 3GPP standard referred to as the Generic Access Network (GAN), wherein the UNC is correspondingly referred to as the Generic Access Network Controller (GANC). The UNC/GANC also contains a security gateway, referred to as UNC-SGW/GANC-SEGW, to support IPsec (Internet Protocol Security) connections. The IPsec connections are terminated in the UNC-SGW/GANC-SEGW, and the other endpoint is the mobile station.

In 3G/UMTS systems, the radio access network is referred to as UMTS RAN or UTRAN. In UTRAN, the radio access network controller is referred to as the Radio Network Controller (RNC). The interface to the core network for circuit-switched traffic is referred to as the Iu-CS interface, and the interface to the core network for packet-switched traffic is referred to as the Iu-PS interface.

In systems that use IP communications between the mobile station and the radio access network controller, there is a security concern that the IP communications might be successfully infiltrated by unauthorized parties posing as legitimate subscribers, which could result in considerable mischief in the system.

In UMA/GAN, mobile identities are used in the following instances:
1. When the mobile station (MS) establishes the IPsec secure connection (IPsec tunnel) towards the security gateway UNC-SGW (GANC-SEGW), the UNC-SGW triggers authentication of the MS towards a AAA-server (Authentication, Authorization and Accounting server). The AAA-server then authenticates the MS using the IMSI (International Mobile Subscriber Identity) of the MS, as provided by the MS.
2. When the MS registers at the UNC, the MS provides its IMSI to the UNC.
3. When the MS communicates with the CS facility of the core network (e.g., MSC), the MS uses either its IMSI or its TMSI (Temporary Mobile Subscriber Identity) to identify itself.
4. When the MS communicates with the PS facility of the core network (e.g., SGSN), the MS uses either its IMSI or its P-TMSI (Packet Temporary Mobile Subscriber Identity) to identify itself.

In the interest of security, the UMA specifications recommend that the UNC-SGW and the UNC verify that the same IMSI is used in operations 1 and 2 above, and solutions that perform this verification have been proposed in U.S. Ser. No. 11/047,880, which is incorporated herein by reference.

Another known solution, described in PCT/IB2005/000103, which is incorporated herein by reference, enables the UNC to verify that the same IMSI is used in operations 2 and 3 above. More specifically, the UNC performs the desired verification by analyzing upper layer (Layer 3, Mobility Management (MM)) messages sent between the MS and the MSC. However, the required analysis of upper layer message traffic can be complicated, and consume substantial processing power, in part because this traffic is intended to be transparent to the UNC. Thus, the UNC must engage in "layer violation", accessing information that is transmitted according to communication protocols that are not terminated at the UNC. Moreover, there are circumstances where the upper layer message traffic between the MS and the MSC does not include the IMSI information that is needed in order to perform the verification. For example, a Temporary Mobile Station Identity (TMSI) may be used instead of the IMSI.

The operation designated at 4 above also gives rise to the possibility of unauthorized infiltration.

It is desirable in view of the foregoing to provide a more comprehensive solution to the problem of securing systems such as described above against infiltration by unauthorized parties.

SUMMARY OF THE INVENTION

In exemplary embodiments of the invention, an identifier, required by an access controller in order to support resource allocation associated with a predetermined condition, is sent from a core network to the access controller independently of the predetermined condition. The identifier is thus available to the access controller for verification of mobile user identity, regardless of whether it is needed to support resource allocation. In some embodiments, the access controller receives an identifier in a communication sent by a core network according to a communication protocol. The access controller terminates the communication protocol to access the communication, and uses the identifier for verification of mobile user identity.

DETAILED DESCRIPTION

Figure 1:
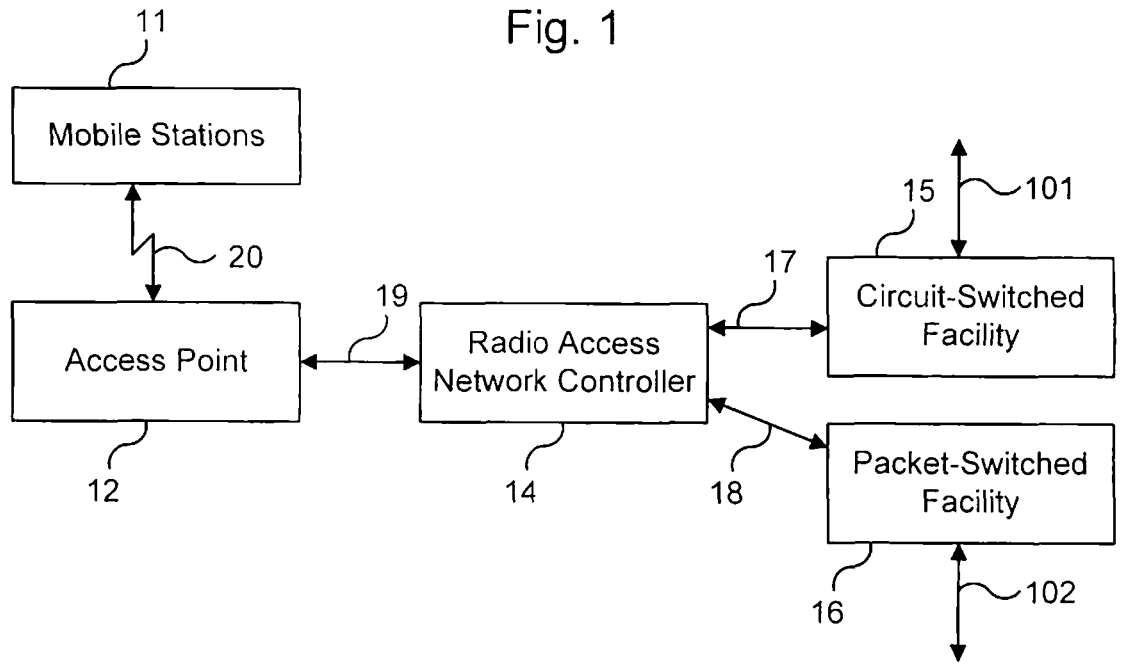
FIG. 1 diagrammatically illustrates a wireless mobile communication system according to exemplary embodiments of the invention.

FIG. 1 diagrammatically illustrates a wireless mobile communication system according to exemplary embodiments of the invention. As is evident, the general architecture of the example of FIG. 1 is similar to the conventional system described above. More specifically, the system of FIG. 1 includes mobile stations designated generally at 11, a radio access network including an access point 12 and a radio access network controller 14, a core network including a circuit-switched facility 15 and a packet-switched facility 16, a circuit-switched interface 17, a packet-switched interface 18, a wired or wireless (e.g., wireless broadband network) IP link 19, and a wireless IP link 20. The circuit-switched facility 15 and the packet-switched facility 16 are coupled to the remainder of the core network as shown generally at 101 and 102. In contrast to conventional systems, exemplary embodiments of the present invention exploit functionality that is already provided in conventional wireless communication systems, in order to provide security against infiltration by unauthorized parties.

Dual Transfer Mode (DTM) is defined in the technical specification, 3GPP TS 43.055. The DTM functionality is provided to permit a mobile station to use both circuit-switched resources and packet-switched resources simultaneously. The DTM functionality is supported in wireless communication systems such as mentioned above, and provides mechanisms that permit the radio access network controller to coordinate the allocation of radio resources for both the circuit-switched domain and the packet-switched domain. One of these mechanisms is that the radio access network controller can receive the IMSI of a given mobile station from both the circuit-switched facility of the core network and the packet-switched facility of the core network. The aforementioned DTM technical specification states that, if the core network, the radio access network controller and the mobile station support DTM procedures, then the IMSI will be provided to the radio access network controller in the following instances: call establishment (circuit-switched calls such as voice calls); session establishment (packet-switched user sessions); and external handover of the mobile station from one radio access network controller to another. Thus, according to DTM operation, both the circuit-switched facility of the core network and the packet-switched facility of the core network can provide the IMSI to the radio access network controller.

According to further conventional practice in radio access networks, when a mobile station registers for radio access network service, it reports its IMSI to the radio access network controller, and the controller stores the IMSI for that mobile station in a corresponding mobile station context maintained in the controller. That context is maintained in the controller for as long as the mobile station remains registered with the radio access network.

Exemplary embodiments of the invention exploit the above-described IMSI-reporting feature of DTM operation, and the above-described mobile station context feature of the radio access network controller. These features are used in combination to permit the radio access network controller to determine whether the identity that the mobile station is using for its interaction with the radio access network controller (which identity is stored in the corresponding mobile station context) matches the identity that the mobile station is using for its interaction with the core network (which identity is provided by one or both of the circuit-switched and packet-switched facilities).

Below are presented brief descriptive examples of how a core network can provide an IMSI to a radio access network controller according to conventional DTM capabilities, and how this conventional IMSI-reporting feature of DTM is exploited for identity verification purposes according to exemplary embodiments of the invention.

In the conventional call establishment situation, the radio access network controller initiates, on behalf of a registered mobile station, the establishment of a signaling connection that is used on the circuit-switched interface to the core network. (In some conventional systems, the signaling connection is an SCCP (Signaling Connection Control Part) connection.) The signaling connection is associated with the mobile station context for that mobile station. If DTM operation is in effect, the circuit-switched facility of the core network sends to the radio access network controller a message that includes the IMSI associated with that mobile station. (In some conventional systems, this message is referred to as a Common ID message, as defined in the technical specification 3GPP TS 48.008). This IMSI-carrying message can be included in a confirming message that confirms the establishment of the signaling connection (e.g., the SCCP Connection Confirm (CC) message), or in a separate message after the confirming message, once the signaling connection is already established. In either instance, the IMSI-carrying message is transmitted to the radio access network controller on the circuit-switched interface according to a protocol that terminates at the radio access network controller.

According to exemplary embodiments of the invention, in the call establishment situation, the radio access network controller can verify the identities used by the mobile station by comparing the IMSI in the IMSI-carrying message received from the circuit-switched facility to the IMSI stored in the mobile station context associated with the SCCP connection (the latter IMSI having been reported by the mobile station to the radio access network controller at registration, as described above). If the IMSIs match, then the call can proceed normally. If the IMSIs do not match, then the radio access network controller can take action according to a security policy, examples of which are described hereinbelow.

In the operation of some conventional systems, the following type of situation can occur during the process of establishing a signaling connection between a radio access network controller and a circuit-switched facility of a core network. The radio access network controller, when initiating the signaling connection, provides the circuit-switched facility with information that the circuit-switched facility can already use to produce the IMSI for the associated mobile station. For example, this will happen whenever the radio access network controller provides the TMSI to the circuit-switched facility. For example, the TMSI can be received from the mobile station in an upper layer message and transparently forwarded by the radio access network controller to the circuit-switched facility in an initial message. (In some conventional systems, this upper layer message is referred to as a Complete Layer 3 information message, as defined in the technical specification 3GPP TS 48.008.) In some situations, this upper layer message is included in a connection request message (e.g., an SCCP Connection Request message), which connection request message is sent at a point in time after the circuit-switched facility has (for whatever reason) already allocated a TMSI for the mobile station. Some embodiments of the invention exploit this type of situation, for example, by having the circuit-switched facility include the above-described IMSI-carrying message (e.g., a Common ID message) in its confirmation (e.g., an SCCP Connection Confirm message) of the establishment of the requested signaling connection. In such embodiments, the radio access network controller can receive the IMSI from the circuit-switched facility at junctures other than call establishment.

Considering the downlink (directed toward the mobile station) aspect of the conventional session establishment situation, the packet-switched facility sends downlink data messages that carry data that is downloaded from the core network to the mobile station. The IMSI and a corresponding temporary identifier are included in these downlink data messages. (In some conventional systems, the temporary identifier is referred to as a TLLI, and the downlink data messages are referred to as DL-UNITDATA messages.) These downlink data messages are sent to the radio access network controller on the packet-switched interface according to a protocol that terminates at the radio access network controller. (In some conventional systems, the protocol is referred to as BSSGP, or Base Station Subsystem GPRS Protocol, as defined in the technical specification 3GPP TS 48.018.)

In some embodiments, the radio access network controller can check the IMSI received in all or any desired subset of the downlink data messages. More specifically, for a given downlink data message, the radio access network controller can use the temporary identifier received in the message to identify the mobile station context that corresponds to that identifier. Then, the IMSI received in the downlink data message can be compared to the IMSI stored in the identified mobile station context.

In some downlink session establishment situations in conventional systems, a paging message sent from the packet-switched facility to a mobile station may include both the IMSI and a corresponding temporary identifier for the mobile station. (In some conventional systems, the paging messages are referred to as PS PAGING BSSGP PDUs, and the temporary identifier is a TLLI.) In some embodiments of the invention, the radio access network controller exploits this type of situation for mobile station identity verification purposes. That is, the radio access network controller can use the temporary identifier received in the paging message to identify the mobile station context that corresponds to that identifier. Then, the IMSI received in the paging message can be compared to the IMSI stored in the identified mobile station context.

Considering now the uplink (directed toward the core network) aspect of the conventional session establishment situation, the radio access network controller can send to the packet-switched facility, via the packet-switched interface, a message that requests the current radio access capabilities of the mobile station. According to conventional practice, this request message can include a request for the IMSI associated with a specific temporary identifier (e.g., TLLI) that the packet-switched facility is currently using for the mobile station. The packet-switched facility returns a response message that includes radio access capabilities, including the requested IMSI. (The Radio Access Capability Update procedure defined in the technical specification 3GPP TS 48.018 is one example of this conventional procedure.) According to exemplary embodiments of the invention, the radio access network controller can verify the identities used by the mobile station by comparing the IMSI in the packet-switched facility's response message to the IMSI stored in the associated mobile station context. If the IMSIs match, then the uplink session can proceed normally. If the IMSIs do not match, then the radio access network controller can take action according to a security policy, examples of which are described hereinbelow.

In conventional instances of external handover of a mobile station where DTM operation is in effect, the mobile station's IMSI is included in a handover request message sent by the circuit-switched facility of the core network to the radio access network controller that has been selected as the target of the handover operation. The handover request message is conventionally transmitted to the radio access network controller on the circuit-switched interface according to a protocol that terminates at the radio access network controller. According to exemplary embodiments of the invention, the targeted radio access network controller can verify the identities used by the mobile station by comparing the IMSI in the handover request message to the IMSIs stored in the mobile station contexts currently maintained by the targeted radio access network controller. If the mobile station is currently registered with the targeted radio access network controller, then a match will be found. In some embodiments, if the IMSI from the handover request message does not match any of the IMSIs stored in the mobile station contexts, then the targeted radio access network controller can reject the external handover request message, and take action according to a security policy, examples of which are described hereinbelow.

If the IMSI in the handover request message matches an IMSI of a mobile station context stored in the targeted radio access network controller, then the external handover can proceed. First, the targeted radio access network controller creates a handover command message, as is conventional. But according to exemplary embodiments of the invention, the targeted radio access network controller associates the created handover command message with the mobile station context that contains the matched IMSI. The handover command message is included in a handover request acknowledge message that is sent from the targeted radio access network controller to the circuit-switched facility according to conventional practice. The circuit-switched facility then forwards the handover command message to the mobile station via the currently serving radio access network controller, according to conventional practice. The mobile station sends the handover command message to the targeted radio access network controller in a handover access message according to conventional practice.

Further according to conventional practice, when a targeted radio access network controller receives a handover access message from a mobile station, that handover access message is carried on a signaling connection (e.g., a TCP connection) that points to the mobile station context that was created when that mobile station registered with the targeted radio access network controller. This signaling connection operates according to a protocol that terminates in the targeted radio access network controller. According to exemplary embodiments of the invention, when a targeted radio access network controller receives the handover access message from a mobile station, it identifies the mobile station context associated with the handover command message contained in the received handover access message, and then determines whether the signaling connection that delivered that handover command message also points to the identified mobile station context. If so, then the handover can be completed. Otherwise, the targeted radio access network controller can take action according to a security policy.

In the above-described embodiments of the invention that perform mobile station identity verification in external handover situations, the mobile station identity verification is based on a determination of whether or not the handover command message, and the signaling connection that delivered it, are both associated with the same mobile station context. In some embodiments, this is accomplished by: finding the mobile station context associated with the handover command message, and retrieving the IMSI contained in that context; finding the mobile station context associated with the signaling connection that delivered the handover command message, and retrieving the IMSI contained in that context; and comparing the retrieved IMSIs. If the retrieved IMSIs match, this means that the IMSI used by the mobile station at the core network matches the IMSI used by the mobile station at the targeted radio access network controller.

In some embodiments, the security policy requires deregistration of the mobile station whose IMSI is not verified. This is accomplished in some embodiments by, for example, deleting from the radio access network controller the mobile station context associated with the mobile station whose IMSI is not verified. In some embodiments, the security policy requires entry of the unverified IMSI into one or more logs conventionally maintained in the system for recording and tracking security issues. The security policy in some embodiments requires blacklisting the unverified IMSI. In various embodiments, the blacklisting is implemented in the radio access network controller, the security gateway, or an AAA (Authentication, Authorization and Accounting) server, and various combinations thereof. In various embodiments, the aforementioned deregistration, logging, and blacklisting policies are implemented together in the various possible combinations thereof.

Referring again to the foregoing call establishment, session establishment, and external handover examples, in each instance, conventional DTM capabilities provide for the communication of the mobile station's IMSI from the core network to the radio access network controller via a protocol that is terminated in the radio access network controller. Exemplary embodiments of the invention can, as described in detail above, re-use these IMSI-reporting capabilities of DTM for purposes of verifying mobile station identities. As mentioned above, the IMSI-reporting feature of DTM is conventionally provided to the radio access network controller when the core network, the radio access network controller, and the mobile station all support DTM procedures.

Exemplary embodiments of the invention employ measures to ensure that the IMSI-reporting feature normally used to support DTM is always available to support the desired IMSI verification, regardless of whether DTM operation is in effect. In some embodiments, the various radio access network controllers have respectively corresponding static configurations stored in the core network, and if a particular controller includes IMSI verification capability, the corresponding static configuration indicates that capability. If the static configuration indicates that a radio access network controller includes IMSI verification capability, then the core network will know that the IMSI-reporting feature of DTM is to be used when interfacing with that controller, regardless of whether DTM operation is in effect.

In some embodiments, a given radio access network controller can dynamically inform the circuit-switched facility about its IMSI verification capability when it sends a message to initiate a signaling connection. In some embodiments, a message such as a Complete Layer 3 Information Message, conventionally transported together with the message that initiates establishment of an SCCP connection, can also be used to inform the circuit-switched facility about the IMSI verification capability of the radio access network controller. The circuit-switched facility will then know that the IMSI-reporting feature of DTM is to be used when interfacing with that radio access network controller, regardless of whether DTM operation is in effect.

In some embodiments, the radio access network controller can dynamically indicate its IMSI verification capability in a handover request acknowledge message that it sends to the circuit-switched facility in response to the aforementioned handover request message. In response to such a handover request acknowledge message, the circuit-switched facility can, for example, send a Common ID message back to the radio access network controller.

Various embodiments use various combinations of both the static configuration and dynamic messaging features described above for informing the core network that the radio access network controller includes IMSI verification capability, and will thus require the IMSI-reporting feature of DTM regardless of whether DTM operation is in effect.

In some embodiments, the core network always uses the IMSI-reporting feature of DTM whenever it interfaces with any radio access network controller.

Figure 2:
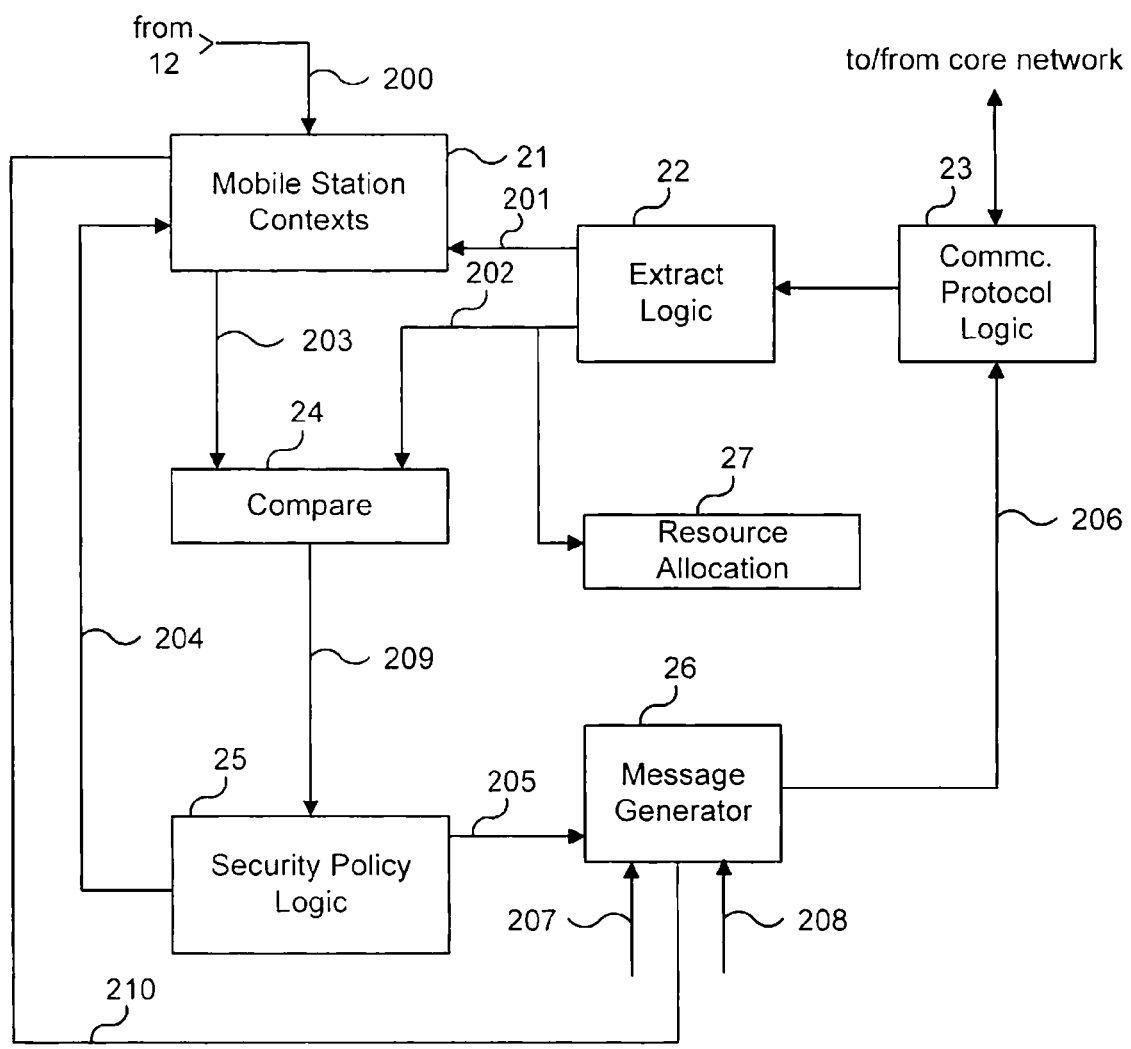
FIG. 2 diagrammatically illustrates the radio access network controller of FIG. 1 in more detail according to exemplary embodiments of the invention.

FIG. 2 diagrammatically illustrates the radio access network controller 14 of FIG. 1 in more detail according to exemplary embodiments of the invention. The radio access network controller of FIG. 2 includes mobile station context storage 21 that receives mobile station registration information 200, as described in detail above. The mobile station context storage 21 can be searched, for example in response to a search input 201, to find a context that contains a desired IMSI (or other analogous identifier). In various embodiments, the search input 201 can receive any of the exemplary search criteria described in detail above. The search criteria for the search input 201 can be provided, for example, in any of the communications, described in detail above, that the core network can use to report IMSIs to the radio access network controller 14. As previously described, the core network transmits these communications according to conventional communication protocols that are terminated in the radio access network controller. In the example of FIG. 2, the communication protocols are terminated in protocol logic 23.

Extraction logic 22 extracts the search criteria from the incoming communications, and applies it to the search input 201 of the mobile station context storage 21. The extraction logic 22 also extracts the IMSI (or other analogous identifier) from the incoming communication, and provides it at 202 as an input to compare logic 24, whose other input 203 receives the IMSI (or other analogous identifier) that results from searching the mobile station context storage. The compare logic 24 compares the IMSIs (or other analogous identifiers) at 202 and 203 to verify whether they match. If a match is not detected, the compare logic 24 activates a signal 209 to security policy logic 25 that can implement, for example, any of the security policies described in detail above.

The security policy logic 25 can activate a deregister signal 204 to deregister the unverified mobile station from the mobile station context storage 21, and/or can produce information which indicates that the unverified mobile station should be entered into one or more appropriate system security logs and/or that the unverified mobile station should be blacklisted. This security log and/or blacklist information is provided at an input 205 of a message generator 26 that can include the information in a suitable message (or messages) for transmission to the core network according to conventionally available communication protocols supported by the protocol logic 23. The message generator 26 has an output 206 that provides messages to the protocol logic 23 for protocol processing.

In various embodiments, the message generator 26 is responsive to an input 207 to produce for transmission to the packet-switched facility any of the exemplary messages described in detail above that request the current radio access capabilities of a mobile station. In various embodiments, the message generator 26 is responsive to an input 208 to produce for transmission to the core network any of the exemplary messages described in detail above that inform the core network of the IMSI verification capability of the radio access network controller.

In some embodiments, the message generator 26 is cooperable with the mobile station context storage 21, as indicated generally at 210, to create for transmission to the circuit-switched facility 15 a handover command message that is associated with a mobile station context that has been identified based on an IMSI (or analogous identifier) received from the circuit-switched facility in a handover request message. In some embodiments, the compare logic 22 and mobile station context storage 21 are cooperable for verifying that a received handover command message, and the signaling connection that delivered it, are both associated with the same mobile station context.

FIG. 2 also illustrates that, in some embodiments, during DTM operation, the IMSI at 202 is also provided to a radio resource allocation coordinator 27 that coordinates the allocation of radio resources for both the circuit-switched domain and the packet-switched domain. In such embodiments, the controller 14 uses the IMSI received from the core network for two distinct purposes, DTM resource allocation, and mobile user identity verification.

Figure 3:
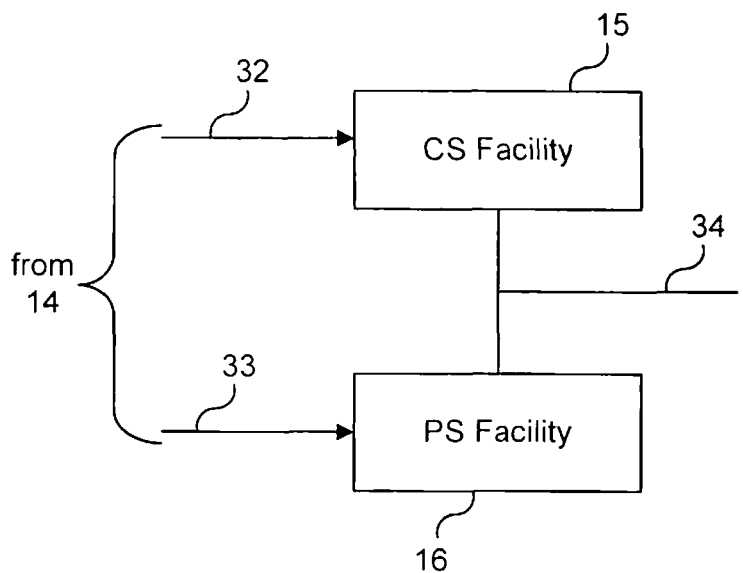
FIG. 3 diagrammatically illustrates the core network of FIG. 1 in more detail according to exemplary embodiments of the invention.

FIG. 3 diagrammatically illustrates the core network of FIG. 1 in more detail according to exemplary embodiments of the invention. As shown in FIG. 3, information 34 available to the circuit-switched facility 15 and the packet-switched facility 16 can indicate that, independently of whether DTM is being used, IMSI-reporting capabilities associated with DTM are to be employed in interactions with a radio access network controller. As described in detail above, in some embodiments, the information 34 indicates that the IMSI-reporting capabilities are to be always unconditionally employed. As also described in detail above, in some embodiments, the information 34 includes entries in a configuration database. If the entry for a given radio access network controller indicates IMSI verification capabilities, then that controller requires the IMSI-reporting capabilities of DTM, independently of whether DTM operation is in effect.

In some embodiments, the circuit-switched facility 15 receives at 32 from the radio access network controller 14 messages (for example, those described in detail above) which indicate that the radio access network controller includes IMSI verification capability. In some embodiments, the packet switched facility 16 receives at 33 from the radio access network controller 14 messages (for example, those described in detail above) which indicate that the radio access network controller includes IMSI verification capability. If an incoming message indicates that the radio access network controller 14 includes IMSI-verification capability, then the associated facility 15 or 16 knows that controller will require the IMSI-reporting capabilities of DTM, independently of whether DTM operation is in effect.

In some embodiments, the packet-switched facility 16 can receive at 33 messages (for example, those messages described in detail above) from the radio access network controller 14 that request the current radio access capabilities of a mobile station.

It will be evident to workers in the art that exemplary embodiments of the invention such as those described above can be readily implemented, for example, by suitably modifying software, hardware, or a combination of software and hardware in conventional components such as the conventional radio access network controllers, circuit-switched facilities and packet-switched facilities mentioned above.

Although exemplary embodiments of the invention have been described above in detail, this does not limit the scope of the invention, which can be practiced in a variety of embodiments.

What is claimed is:

1. A radio access network controller interoperable with a wireless access point providing a mobile station with wireless access to a core network, said controller comprising:
   at least one microprocessor;
   a non-transitory computer-readable storage medium, coupled to the at least one microprocessor, including computer-readable instructions, when executed by the at least one microprocessor, are further configured for:
   creating, when the mobile station registers with the radio access network, a mobile station context which includes a first identifier, and storing the mobile station context in a mobile station context storage;
   receiving a handover request message transmitted by the core network, said handover request message providing, for use by said radio access network controller, the first identifier used by the core network to identify the mobile station;
   identifying the mobile station context associated with the first identifier;
   creating a handover command message that contains the first identifier;
   associating the handover command message with the mobile station context and sending the handover command message to the core network for forwarding to the mobile station;
   receiving a handover access message from a mobile station containing the handover command message;
   searching the mobile station context storage to identify a mobile station context associated with the received handover command message;
   extracting the first identifier from the received handover command message;
   extracting a second identifier from the identified mobile station context;
   comparing the first identifier extracted from the received handover command message to the second identifier; and
   determining whether the first identifier extracted from the handover request message matches the second identifier to verify the identity of the mobile station for handover.

2. The radio access network controller of claim 1, wherein the computer-readable instructions, when executed by the at least one microprocessor are, further configured for using said first identifier to support communication resource allocation for said mobile station.

3. The radio access network controller of claim 1, wherein the computer-readable instructions, when executed by the at least one microprocessor, are further configured for implementing a security policy if no match is determined.

4. The radio access network controller of claim 3, wherein said security policy specifies one of deregistering said mobile station from said radio access network controller, and wherein the computer-readable instructions, when executed by the at least one microprocessor, are further configured for transmitting to the core network a communication that indicates that said mobile station has failed security verification.

5. The radio access network controller of claim 1, wherein the computer-readable instructions, when executed by the at least one microprocessor, are further configured for transmitting to the core network a communication that directs the core network to provide the first identifier when the mobile station registers with the radio access network.

6. The radio access network controller of claim 1, wherein said communication further includes, in addition to said first identifier, further information that the core network has provided for processing by said radio access network controller.

7. radio access network controller of claim 1, wherein the first identifier is an International Mobile Subscriber Identity (IMSI) of the mobile station from a circuit-switched facility of the core network.

8. The radio access network controller of claim 1, wherein the mobile station context is stored in the radio access network controller.

9. A method for use in an radio access network controller that cooperates with a wireless access point to provide a mobile station with wireless access to a core network, said method comprising the steps of:

creating, when the mobile station registers with the radio access network, a mobile station context which includes a first identifier, and storing the mobile station context in a mobile station context storage;

receiving a handover request message transmitted by the core network, said handover request message providing, for use by the radio access network controller, the first identifier used by the core network to identify the mobile station;

identifying the mobile station context associated with the first identifier;

creating a handover command message that contains the first identifier;

associating the handover command message with the mobile station context associated with the first identifier and sending the handover command message to the core network for forwarding to the mobile station;

receiving a handover access message from a mobile station containing the handover command message;

searching the mobile station context storage to identify a mobile station context associated with the received handover command message;

extracting the first identifier from the received handover command message;

extracting a second identifier from the identified mobile station context;

comparing the first identifier extracted from the received handover command message to the second identifier; and determining whether the first identifier extracted from the received handover request message matches the second identifier to verify the identity of the mobile station for handover.

10. The method of claim 9, further comprising using said first identifier to support communication resource allocation for said mobile station.

11. The method of claim 9, further comprising implementing a security policy if no match is determined.

12. The method of claim 11, wherein said implementing step includes one of deregistering said mobile station from the radio access network controller and transmitting to the core network a communication that indicates that said mobile station has failed security verification.

13. The method of claim 9, further comprising transmitting to the core network a communication that directs the core network to provide the first identifier when the mobile station registers with the radio access network.

14. The method of claim 9, wherein said communication further includes, in addition to said first identifier, further information that the core network has provided for processing by the radio access network controller.

* * * * *